T. ROGERS.
Sirup Measure.

No. 34,526.  Patented Feb. 25, 1862.

Witnesses.
Charles E. Foster
C. Howson

Inventor
T. Rogers
Henry Howson atty

UNITED STATES PATENT OFFICE.

THOMAS ROGERS, OF MONTGOMERY SQUARE, PENNSYLVANIA.

IMPROVEMENT IN LIQUID-MEASURES.

Specification forming part of Letters Patent No. 34,526, dated February 25, 1862.

*To all whom it may concern:*

Be it known that I, THOMAS ROGERS, of Montgomery Square, Montgomery county, Pennsylvania, have invented an Apparatus for Measuring and Discharging Sirups, &c.; and I do hereby declare the following to be a full, clear, and exact description of the same, reference being had to the accompanying drawings, and to the letters of reference marked thereon.

My invention consists of an apparatus, fully described hereinafter, for measuring and discharging sirups and other viscid fluids with that accuracy and rapidity which cannot be attained by the use of the appliances heretofore employed for the same purpose.

In order to enable others to make and use my invention, I will now proceed to describe its construction and operation.

Figure 1:
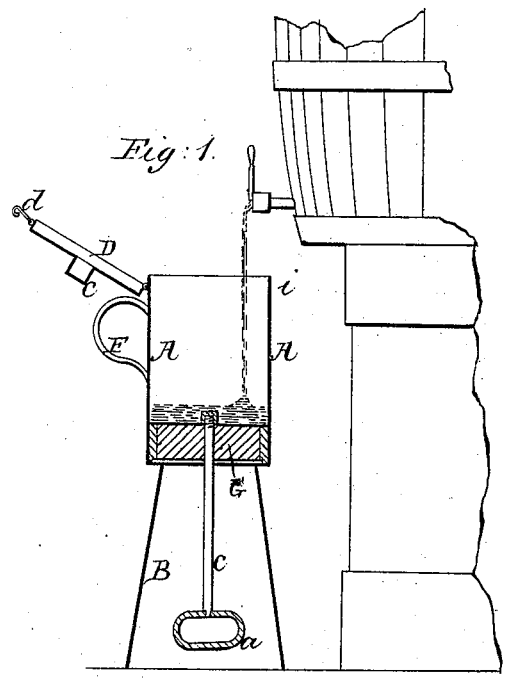
Figure 2:
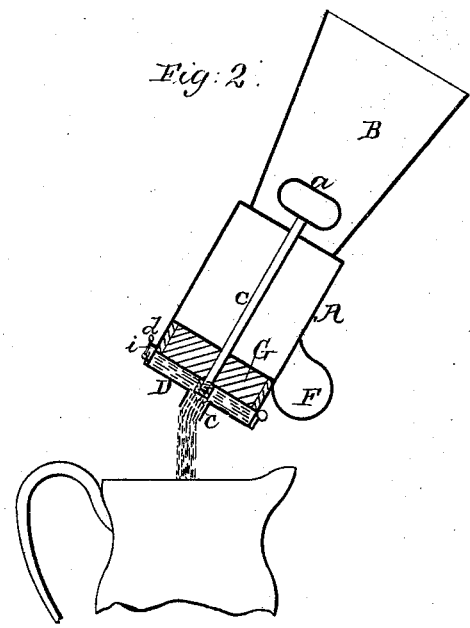

In reference to the accompanying drawings, which form a part of this specification, Figure 1 is a sectional view of my apparatus for measuring and discharging sirups, &c.; Fig. 2, the same as it appears when the sirup is being discharged.

A is a cylindrical measure, of tin or other suitable material, provided with the usual handle F and secured to the hollow stand B. To the upper edge of the measure is hinged the cap or cover D, from the center of which projects the short tube $c$, the cover being provided with a latch $d$ for hooking over the projection $i$ on the measure. Within the measure is a tightly-packed piston G, to which is secured one end of the rod C, the latter projecting downward through an opening in the bottom of the measure and being provided at its lower end with a suitable handle $a$.

In measuring sirups and other fluids of a viscid nature, not only is much delay experienced in transferring them from one vessel to another, but, as a greater or less quantity of the fluids adheres to the sides of the vessel from which they are poured or to the funnel through which they are directed, there must be an uncertainty in the quantity measured, or the adhering fluid must be removed by a suitable instrument. This delay is in a great measure obviated by the above-described apparatus. The piston is first drawn down to the bottom of the measure and the cap D turned back, as seen in Fig. 1. The sirup or other fluid is then allowed to flow from the cask or other depository into the measure, of which the piston now forms the bottom, this measure being of any standard capacity desired. After the measure is filled and the cover D has been turned down and secured over the mouth by the latch $d$ the apparatus is inverted, so that the tube $c$ shall be over the mouth of the vessel into which it is desired to discharge the fluid, the handle of the measure being held with one hand, while the handle $a$ is grasped in the other, so as to move the piston toward the mouth of the measure, and thereby force the fluid through the tube $c$ (the latter thus serving as a funnel) into the vessel prepared to receive it. The contents of the measure are thus discharged without any delay and without any diminution of the quantity of fluid measured.

I claim as my invention and desire to secure by Letters Patent—

The measure A, with its piston G, and the movable cap D, with its tube $c$, the whole being constructed and arranged substantially as and for the purpose herein set forth.

In testimony whereof I have signed my name to this specification in the presence of two subscribing witnesses.

THOMAS ROGERS.

Witnesses:
 HENRY HOWSON,
 JOHN WHITE.